United States Patent [19]
Nishida

[11] 3,891,436
[45] June 24, 1975

[54] BLEACHED PHASE HOLOGRAMS AND METHOD OF PRODUCING THE SAME

[75] Inventor: Nobuo Nishida, Tokyo, Japan

[73] Assignee: Nippon Electric Company Ltd., Tokyo, Japan

[22] Filed: Feb. 22, 1973

[21] Appl. No.: 334,770

[30] Foreign Application Priority Data

| | | |
|---|---|---|
| Mar. 1, 1972 | Japan | 47-21859 |
| May 31, 1972 | Japan | 47-54475 |
| May 31, 1972 | Japan | 47-54479 |
| June 1, 1972 | Japan | 47-54938 |
| Aug. 4, 1972 | Japan | 47-78529 |

[52] U.S. Cl. .............................. 96/27 H; 96/60 R
[51] Int. Cl.$^2$ ..................... G03C 5/04; G03C 5/32
[58] Field of Search ............... 96/60 R, 27 E, 27 H

[56] References Cited
UNITED STATES PATENTS

| | | | |
|---|---|---|---|
| 2,662,014 | 12/1953 | Umberger | 96/60 R |
| 3,642,472 | 2/1972 | Mayo | 96/60 R |

OTHER PUBLICATIONS

Latta, "Bleaching of Holographic Diffraction Gratings for Maximum Efficiency" Dec. 1968/Vol. 7 No. 12/Applied Optics pp. 2409-2416.

Upatnieks et al, "Diffraction Efficiency of Bleached, Photographically Recorded Interference Patterns," Jan. 1969/Vol. 8, No. 1/Appld. Optics pp. 85-89.

Chang et al., "Holographic Dielectric Grating: Theory & Practice," March 1970/Vol. 9, No. 3/Appld. Optics pp. 713, 716-719.

Burton, "Holographic Storage of Multicolor Information," Aug./Sept. 1972, RCA Engineer Vol. 18 No. 2 pp. 99-105.

*Primary Examiner*—Mary F. Kelley
*Attorney, Agent, or Firm*—Hopgood, Calimafde, Kalil

[57] ABSTRACT

A bleached phase hologram characterized by improved diffraction efficiency combined with improved resistance to irradiation wherein metallic silver grains contained in exposed amplitude hologram made by recording an interference pattern between two coherent light beams on a silver halide photographic emulsion converted to a metal compound selected from the group consisting of lead chromate and a ferrocyanide of the metals nickel, lead, copper and zinc.

1 Claim, No Drawings

BLEACHED PHASE HOLOGRAMS AND METHOD OF PRODUCING THE SAME

This invention relates to phase holograms produced by bleaching amplitude holograms recorded on silver halide photosensitive photographic materials or films.

PROBLEM CONFRONTING THE ART

An important factor in the determination of the relative merits of holograms is the diffraction efficiency. With respect to the observation of a reconstructed image from holograms with the naked eye, a higher diffraction efficiency simply indicates that the laser output may be smaller for a predetermined level of brightness or that a brighter reconstructed image can be observed for a predetermined level of laser output intensity. A higher diffraction efficiency of the holograms, however, has much greater significance, when holograms are used for an optical device. More specifically, in an optical memory system, when a holographic optical memory plate is illuminated by a laser light beam to permit photodetectors disposed behind the plate to detect the diffracted light, the laser must be compact in size, low in power consumption, long in life and inexpensive to manufacture. Moreover, there is a lower limit for the light intensity detectable by an photodetector. Therefore, the intensity of the diffracted light for the memory read-out should be higher than the lower limit. To meet these conflicting requirements, the diffraction efficiency of the hologram should be as high as possible. In general, the higher the diffraction efficiency, the lower becomes the amplifier load, thus facilitating the detection of the diffracted light at a higher signal to noise ratio. Under these circumstances, the research and development work on the improvement of the diffraction efficiency of holograms has been carried out mainly by those engaged in optical memory systems and related devices.

STATE OF THE ART

It was H. Kogelnik who gave the initial guidance for the research on the improvement of diffraction efficiencies of holograms. He theoretically showed at the Symposium on Modern Optics held in New York, Mar. 22 to 24, 1967, that 100% diffraction efficiency could be achieved by the use of phase holograms while the maximum value for the amplitude holograms is only 7.2%. (For the details of the theory, reference is made to the paper entitled "Reconstructing Response and Efficiency of Hologram Grating" published in the Proceedings of the Symposium on Modern Optics, pp. 605 to 617, Polytechnic Press.)

The earliest report on the phase holograms was made by W. T. Cathy. He reports in his paper entitled "Three-Dimensional Wavefront Reconstruction Using a Phase Hologram" published in the Journal of Optical Society of America, vol. 55, No. 4, page 457, that phase holograms can be produced when holograms recorded on a photosensitive material are bleached with an aqueous solution of chromium salts. It was after the pulblication of the Kogelnik paper that research on phase holograms was begun.

The known materials for producing phase holograms include photographic materials (subjected to the bleaching process), ferroelectric crystals, thermoplastic films, photoresist, dichromated gelatin, among others. Among them, the photographic material or film using silver halides as the main constituent have been most often used because of the high sensitivity, broad wavelength range, and the simplicity in handling of such materials.

On the other hand, the known bleaching methods for changing the amplitude hologram recorded on the photographic material to the phase hologram (hereinafter referred to as "bleached phase hologram"), include those which utilize chromium, potassium ferricyanide, and mercury chloride. (For the details of the bleached phase hologram, reference is made to "Diffraction Efficiency of Bleached, Photographically Recorded Interference Patterns," Applied Optics, vol. 8, No. 1, pp. 85–89.) The salts or complex salts chemically produced through these bleaching methods invariably contain silver ions, which tend to darken because of photochemical reaction when exposed to light rays, particularly ultraviolet rays. This results in a marked deterioration of the diffraction efficiency. Such deterioration is noticeable particularly with bleached phase holograms containing silver chloride or silver bromide. In contrast, those bleached phase holograms containing silver ferrocyanide $Ag_4Fe(CN)_6$ or silver iodide (AgI) exhibit a high stability against printing-out, i.e., the high irradiation-resistant property under the state of exposure to ultraviolet rays, as is reported in the D. H. McMahon, et al., paper entitled "Measurements of the Stability of Bleached Photographic Phase Holograms" published in the Applied Optics, Vol. 9, No. 6, pp. 1363 to 1368. However, such bleached phase holograms are not satisfactory for use in optical memory devices because their diffraction efficiencies are reduced to about 50 to 60 percent of the pre-exposure values for long periods of exposure time. Further, these bleached silver salts or complex salts exhibit good light transmittance. As a result, holograms with such salts on them are transparent over the whole range of the visible light wavelengths, making it difficult to ascertain whether the hologram is actually applied onto the hologram holder of the memory device. This property may be advantageous for the achievement of a high diffraction effiency. From the practical point of view, however, the transparency makes it very difficult to apply the hologram memory plates onto the memory equipment and to accurately adjust the point of the irradiation by coherent light rays for readout.

OBJECTS OF THE INVENTION

It is therefore an object of the present invention to provide bleached phase holograms, which have high diffraction efficiency and high stability or resistance against exposure to light rays, particularly ultraviolet rays.

It is another object of the present invention to provide methods of producing bleached phase holograms having high diffraction efficiency combined with the property of high irradiation-resistance, by substituting other metal ions for silver ions contained in the bleached phase holograms produced by the conventional bleaching method.

A still another object of the present invention is to provide transparent, colored holograms which facilitate the application thereof onto optical memory devices without resorting to stray-light-intercepting means.

THE INVENTION

I have found that bleached phase holograms can be improved both with respect to diffraction efficiency and resistance to irradiation by replacing silver ferrocyanide $Ag_4Fe(CN)_6$ contained in the conventional-type bleached phase holograms with a compound selected from the group consisting of lead chromate and a ferrocyanide of the metals nickel (Ni), lead (Pb), copper (Cu) and zinc (Zn).

In the substitution of such other metal salts or complex salts for silver grains contained in the developed emulsion of an ordinary photographic material, particular care must be taken not to make the salts or complex salts become coarse-grained and thereby prevent scattering of incident light rays. A point which should be considered is that the diffraction efficiency might tend to be lowered depending upon the index of refraction of the substituted metal salts or complex salts. Further, there are some cases where the substitution tends to deteriorate the irradiation-resistant property.

As illustrative of the various embodiments of the invention, the following example is given.

EXAMPLE 1A

A photographic material exposed to an interference pattern formed between an object light beam and a reference light beam was developed and fixed to produce an ordinary amplitude hologram. The amplitude hologram was then immersed in an approximate 3% aqueous solution of potassium ferricyanide $K_3Fe(CN)_6$ for about 3 to 10 minutes to convert the black silver grains in the hologram to silver ferrocyanide $[Ag_4Fe(CN)_6]$. The processed amplitude hologram was then dipped for about 5 to 10 minutes in an aqueous solution prepared by dissolving 5 grams of nickel nitrate and 15 grams of potassium citrate in 100 cc of distilled water, about 5 cc of 10 percent dilute nitric acid solution being thereafter added thereto. As a result of the dipping process, at least a part of the silver ferrocyanide $[Ag_4Fe(CN)_6]$ was converted to nickel ferrocyanide $[Ni_2Fe(CN)_6]$. Thus, a bleached phase hologram containing nickel ferrocyanide $[Ni_2Fe(CN)_6]$ in place of silver ferrocyanide $[Ag_4Fe(CN)_6]$ was produced.

EXAMPLE 1B

The above-mentioned ordinary amplitude hologram of Example 1A was dipped for 5 to 15 minutes in a mixed solution made up of the following: 20 parts of a first aqueous solution (I) prepared by dissolving 5 grams of nickel nitrate $[Ni(NO_3)_2]$ and 15 grams of potassium citrate in 100 cc of distilled water, 10 parts of a second aqueous solution (II) prepared by dissolving 4 grams of potassium ferricyanide per 100 cc of distilled water, and one part of a third solution (III) of 10% nitric acid, such that the ratio of the solutions (I) to (II) to (III) is 20:10:1. A bleached phase hologram containing nickel ferrocyanide $[Ni_2Fe(CN)_6]$ was thus produced.

The bleached phase holograms produced by the methods of Example 1A and 1B are slightly brownish so that they are visible before and after their application onto the memory system. This is one of the advantages of the present holograms over the ordinary bleached holograms processed with only potassium ferricyanide. For the comparison of the holograms of Examples 1A and 1B with conventional holograms with regard to the irradiation-resistant property, both the former and the latter were exposed to irradiation from a 250 W mercury lamp for 15 minutes. The diffraction efficiency of the conventional type which had undergone the bleaching with only potassium ferricyanide was decreased to about 60% of the pre-exposure value; whereas, the bleached holograms produced in accordance with the invention showed a lower decrease of down to about 75% of the pre-exposure value. Since the conventional bleached phase holograms processed with potassium ferricyanide have been highly valued for their irradiation-resistant property, it will be apparent that the present invention may be considered to have markedly improved that particular property. With respect to the diffraction efficiency, holograms of the foregoing examples showed a noticeable improvement.

EXAMPLE 2A

In this example, the above-mentioned conventional amplitude hologram was contacted with an approximate 3% aqueous solution of potassium ferricyanide for about 3 to 10 minutes as described in Example 1A. It was then dipped for about 5 to 10 minutes in another aqueous solution prepared by dissolving 5 grams of lead nitrate $[Pb(NO_3)_2]$ and 15 grams of potassium citrate in 100 cc of distilled water with 5 cc of 10% nitric acid solution being thereafter added. Thus, a bleached phase hologram containing lead ferrocyanide $[Pb_2Fe(CN)_6]$ is produced.

EXAMPLE 2B

The conventional amplitude hologram as in Example 1A was dipped for about 5 to 15 minutes in a mixed solution made up of 15 parts of a first aqueous solution (IA) prepared by dissolving 10.5 grams of lead nitrate $[Pb(NO_3)_2]$ in 150 cc of distilled water, 18 parts of a second aqueous solution (IIA) prepared by dissolving 2.5 grams of potassium ferricyanide in 180 cc of distilled water and 3 cc of glacial acetic acid, such that the ratio of solutions (IA) to (IIA) is 15:18. As a result, a bleached phase hologram containing lead ferrocyanide $[Pb_2Fe(CN)_6]$ was produced.

The bleached holograms of Examples 2A and 2B have a relatively high diffraction efficiency. More specifically, while the conventional amplitude hologram before processing had a diffraction efficiency of the order of about 0.06 percent at an optical density of about 1.8, the efficiency markedly improved to 12 percent after processing. This improvement is highly desirable since the conventional bleaching method using only potassium ferricyanide exhibits a much lower diffraction efficiency in the range of about 2 to 3 percent. As for the irradiation-resistant property, the holograms of these examples were subjected to the same irradiation test as described in Examples 1A and 1B. The diffraction efficiency was decreased only to 66 percent. This shows that the improvement of that particular property is noticeable compared with the conventional bleached holograms.

EXAMPLE 3A

The above-mentioned conventional amplitude hologram was contacted with an approximately 3% aqueous solution of potassium ferricyanide for 3 to 10 minutes, as in the case of Examples 1A and 2A. It was then dipped for about 5 to 10 minutes in another aqueous solution prepared by dissolving 5 grams of copper nitrate [$Cu(NO_3)_2$] and 15 grams of potassium citrate in 100 cc of distilled water with 5 cc of 10% nitric acid being thereafter added. Thus, a bleached phase hologram was produced containing copper ferrocyanide [$Cu_2Fe(CN)_6$] in place of $Ag_4Fe(CN)_6$.

EXAMPLE 3B

In this example, the conventional amplitude hologram was dipped for about 5 to 15 minutes in a mixed solution made up of the following: 20 parts of a first aqueous solution (IB) prepared by dissolving 5 grams of copper nitrate in 100 cc of distilled water, 10 parts of a second aqueous solution (IIB) prepared by dissolving 15 grams of potassium ferricyanide in 100 cc of distilled water, and one part of a third solution (IIIB) of 10% nitric acid, such that the ratio of solutions (IB) to (IIB) to (IIIB) is 20:10:1. Thus, a bleached phase hologram containing copper ferrocyanide $Cu_2Fe(CN)_6$ was produced.

The bleached holograms of Examples 3A and 3B exhibit a relatively high diffraction efficiency despite the fact that they are slightly colored. More specifically, while the conventional amplitude hologram before processing exhibited a diffraction efficiency of the order of about 0.03 percent (at 6328 angstrom), the efficiency was raised to 4.7 percent after processing. Compared with the highest values of the diffraction efficiency (2 to 3 percent) possible for the conventional bleaching method using only potassium ferricyanide, the value obtained in the examples shows an appreciable improvement. As for the irradiation-resistant property, the holograms of these examples exhibit a performance comparable to the conventional bleached hologram under the same test as those of Examples 1A, 1B, 2A and 2B. It is apparent that the holograms of Examples 3A and 3B have improved diffraction efficiency without adversely affecting the irradiation-resistant property.

EXAMPLE 4A

The above-mentioned conventional amplitude hologram was first brought in contact with an approximately 10% aqueous solution of potassium ferricyanide for about 3 to 10 minutes, as in the case of other examples such as Examples 1A, 2A and 3A. It was then dipped for about 5 to 10 minutes in another aqueous solution prepared by dissolving 5 grams of zinc nitrate [$Zn(NO_3)_2$] and 15 grams of potassium citrate in 100 cc of distilled water, 5 cc of 10% nitric acid being thereafter added. Thus, a bleached phase hologram containing zinc ferrocyanide [$Zn_2Fe(CN)_6$] was produced.

EXAMPLE 4B

The conventional amplitude hologram mentioned in Example 4A was dipped for about 5 to 15 minutes in a mixed solution containing 20 parts of a first aqueous solution (IC) prepared by dissolving 5 grams of zinc nitrate in 100 cc of distilled water and 10 parts of a second aqueous solution (IIC) prepared by dissolving 15 grams of potassium ferricyanide in 100 cc of distilled water; and one part of a third solution (IIIC) of 10% nitric acid, such that the ratio of solutions (IC) to (IIC) to (IIIC) is 20:10:1. Thus, a bleached phase hologram containing zinc ferrocyanide [$Zn_2Fe(CN)_6$] was produced.

The bleached holograms of Examples 4A and 4B exhibited a relatively high diffraction efficiency. More specifically, while the conventional amplitude hologram before processing exhibited a diffraction efficiency of the order of about 0.07 percent at an optical density of 2.3, the efficiency was raised to about 7 percent after processing. This improvement is highly desirable since the highest diffraction efficiency attainable by the conventional bleaching method using only potassium ferricyanide is only about 2 to 3 percent. As for the irradiation-resistant property, the holograms of Examples 4A and 4B proved to exhibit a performance comparable to those processed by the conventional method. It is apparent, therefore, that the bleached phase holograms of Examples 4A and 4B provide markedly improved diffraction efficiency without adversely affecting the irradiation-resistant property.

EXAMPLE 5

Among the bleached phase holograms of the foregoing examples, those of Examples 2A and 2B exhibit the highest diffraction efficiency, while the irradiation-resistant property is not adversely affected. In order to further improve the latter property, the hologram of Examples 2A to 2B was subjected to further chemical treatment as follows.

First, the hologram obtained at the end of Examples 2A and 2B was washed by water for about 1 hour, and then dipped in a 0.5 percent aqueous solution of potassium dichromate $K_2Cr_2O_7$ for a few minutes to convert chemically lead ferrocyanide [$Pb_2Fe(CN)_6$] to lead chromate $PbCrO_4$. After being washed by water for a few minutes, the hologram was dipped for a few minutes, respectively, in a 1% nitric acid and then in a 1% aqueous solution of sodium thiosulfate [$Na_2S_2O_3$] to remove any possibility of contamination. The hologram was further washed by water for several tens of minutes and then dried. The resultant hologram had a slightly yellowish cast.

Under exactly the same test as those for the other holograms of the examples herein (i.e., irradiation by 250 W mercury lamp for 15 minutes), the present hologram of Example 5 did not show any deterioration of the diffraction efficiency. It is therefore apparent that the processing of Example 5 greatly contributes to the improvement in the irradiation-resistant property without adversely affecting the diffraction efficiency.

Another embodiment for producing a bleached phase hologram comprises the steps of: (1) exposing a photographic film containing a silver halide to an interference light and developing and fixing the pattern on said photographic film, and (2) contacting the processed photographic film with a mixed solution comprising the following: (A) a first aqueous solution of metal nitrate containing about 10.5 grams of lead nitrate per 150 cc of water; (B) a second aqueous solution containing 2.5 grams of potassium citrate per 180 cc of water; and (C) a third solution of glacial acetic acid, such that the ratio of the first to the second to the third solution is about 15:18:1. In a preferred embodiment, the processed film may be further treated by contacting it with a solution of potassium dichromate, such as a 0.5% potassium dichromate solution.

While the invention has been described with particular reference to the various embodiments and examples described herein, it will be apparent that various modifications may be resorted to without departing from the scope of the invention. It is quite apparent that the chemical substitution of the metal salts and metal complex salts described herein for the silver salts and silver complex salts contained in the conventional bleached phase hologram brings about an improvement not only of the diffraction efficiency but also of the irradiation-resistant property. Moreover, such substitution of the salts provides changes in color of the holograms which is advantageous in facilitating the application and removal of the improved holograms onto and from the optical memory device.

What is claimed is:

1. A method of producing a bleached phase hologram comprising the steps of:

exposing a silver halide photographic film to an interference pattern formed between an object light beam and a reference light beam, and developing and fixing the pattern on said photographic film material, contacting said photographic film with an aqueous solution of potassium ferricyanide thereby forming silver ferrocyanide on said film, and then immersing said photographic film in a solution containing a mixture of a first aqueous solution of a metal nitrate selected from the group consisting of nickel, lead, copper and zinc nitrates, a second aqueous solution of potassium citrate, and a third solution of dilute nitric acid, thereby producing a bleached phase hologram.

* * * * *